US011484980B1

(12) United States Patent
Anderson

(10) Patent No.: US 11,484,980 B1
(45) Date of Patent: Nov. 1, 2022

(54) INSTANTLY REMOVABLE SELF-ALIGNING HIGH-ACCURACY MOUNT FOR MOUNTING A CALIBRATION INSTRUMENT TO A CNC WORK TABLE

(71) Applicant: David Anderson, Needham, MA (US)

(72) Inventor: David Anderson, Needham, MA (US)

(*) Notice: Subject to any disclaimer, the term of this patent is extended or adjusted under 35 U.S.C. 154(b) by 76 days.

(21) Appl. No.: 17/237,550

(22) Filed: Apr. 22, 2021

Related U.S. Application Data

(62) Division of application No. 16/188,242, filed on Nov. 12, 2018, now Pat. No. 11,027,382.

(60) Provisional application No. 62/584,838, filed on Nov. 12, 2017.

(51) Int. Cl.
*B23Q 3/10* (2006.01)
*B23Q 3/18* (2006.01)
*B23Q 1/42* (2006.01)

(52) U.S. Cl.
CPC .............. *B23Q 3/102* (2013.01); *B23Q 1/42* (2013.01); *B23Q 3/186* (2013.01)

(58) Field of Classification Search
CPC ........... B23Q 3/102; B23Q 1/42; B23Q 3/186
See application file for complete search history.

(56) References Cited

U.S. PATENT DOCUMENTS

| 7,908,756 | B2* | 3/2011 | Clifford | G01B 21/042 |
| | | | | 33/502 |
| 8,181,948 | B2* | 5/2012 | Blick | B23Q 1/032 |
| | | | | 269/21 |
| 9,903,700 | B2* | 2/2018 | Smith | G01B 21/042 |
| 10,864,624 | B2* | 12/2020 | Semann | B23D 47/025 |
| 11,027,382 | B1* | 6/2021 | Anderson | B23Q 3/102 |
| 2016/0195383 | A1* | 7/2016 | Smith | G01B 21/042 |
| | | | | 33/502 |

* cited by examiner

*Primary Examiner* — Yaritza Guadalupe-McCall
(74) *Attorney, Agent, or Firm* — Lee Weinstein

(57) ABSTRACT

The instant-mount aspect of the present invention allows a user to rapidly accurately dismount a mounted CNC calibration device from a CNC work table, and rapidly replace the CNC calibration device to its previously mounted position within 0.0001, in seconds. The alignment aspect of the present invention allows faster and more robust high-accuracy alignment of a CNC calibration device once it is mounted on a CNC work table. The remote nest aspect of the present invention allows rapid re-positioning of a CNC calibration device within a CNC milling machine cabinet in a way that does not disrupt the data connection between the CNC control computer and the CNC calibration device, and allows for utilization of more of the worktable surface during milling operations.

2 Claims, 18 Drawing Sheets

INSTANTLY REMOVABLE SELF-ALIGNING HIGH-ACCURACY MOUNT FOR MOUNTING A CALIBRATION INSTRUMENT TO A CNC WORK TABLE

CROSS-REFERENCE TO RELATED PATENT APPLICATIONS

This patent application is a divisional application of U.S. patent application Ser. No. 16/188,242, which claims priority to U.S. provisional patent application 62/584,838 (filed Nov. 12, 2017), which are herein incorporated by reference.

FIELD OF THE INVENTION

The field of the invention relates to CNC machine calibration, and in particular to mounting and alignment of instruments used in CNC milling machinery for measurement of exact tool length and tool diameter.

BACKGROUND OF THE INVENTION

Computer numerically controlled milling machines (CNC milling machines) play a vital role in today's manufacturing. CNC machines make economical the prototyping and manufacturing of mechanical parts designed with computer-aided design (CAD) software. CNC milling machines may be thought of as acting like a computer-controlled sculptor, starting with a block of raw material or a partly formed part which will herein be referred to as "the workpiece", and, with the workpiece clamped in place on the machine's work table (which is typically moved under computer control), removing material in just the right places and in just the right amounts to sculpt the workpiece into a more exact (and in some cases completely finished) part. CNC machines save enormously on labor costs needed to mill parts to specified dimensions.

Perhaps more important than the labor savings CNC machines provide, once such machines are programmed to produce a part correctly, they may be relied upon to produce duplicate parts in exactly the same way, time after time, without the possibility of the machine making "mistakes", provided that the machine remains calibrated for each cutting tool's diameter tool length (with respect to a reference point in the tool mounting fixture).

One of the labor costs involved in using a CNC machine is the labor involved in first setting up the precise and repeatable clamping mechanisms used to hold the workpiece to the work table. However, since this is often only done once for a production run of what is often a large number of identical parts, this labor cost may not be dominant.

Another labor cost involved in using CNC machines is the repeated calibration which may be necessary to compensate for cutting tool wear, as many parts are produced, if the cutting tool is not changed, or to calibrate for cutting tool length changes if the cutting tool is changed. Because the cutting edge is typically both sharp, and angled with respect to the circular path it travels in as it cuts, physical contact with a deflectable surface in a calibrated position is typically the preferred method of calibrating a CNC machine to the exact tip length and diameter of a cutting tool once the cutting tool has been mounted in the CNC machine. Executing this calibration procedure can account for a substantial portion of the labor cost of producing a run of parts through CNC milling. There is a need for innovative technologies that can reduce the labor costs of repeated calibration of CNC machines which are needed to eliminate errors that would otherwise result from cutting tool wear or changes in cutting length which may result from changing cutting tools.

Calibration devices which allow the calibration of CNC machines for cutting tool tip height with respect to the CNC work table, and cutting tool diameter shall herein be referred to as cutting-tool-contacting calibration devices. Cutting-tool-contacting calibration devices such as the Renishaw OTS™ are commonly used at CNC machining facilities. In order for the Renishaw OTS and similar devices to be usable for accurate calibration (for example calibration within a tolerance of 0.0001 inches), the device must be aligned such that one of its calibration surfaces is parallel to the CNC work table within 0.0001 inches. For square-probe cutting-tool-contacting calibration devices, additional alignment of a second probe surface to a plane perpendicular to a Cartesian axis that is not perpendicular to the work surface is also required. The procedure required to obtain such alignment shall herein be referred to as calibration tool alignment, and is typically accomplished through alignment mechanisms provided in the mount that the manufacturer of the calibration tool (such as the Renishaw OTS) provide for mounting the calibration tool to the CNC work table.

Similar calibration devices which use reflected laser light rather than direct contact to calibrate aspects of CNC machining shall herein be referred to as laser calibration devices. The term "CNC calibration devices" shall be used herein to refer both to cutting-tool-contacting calibration devices and laser calibration devices. A CNC calibration device is typically affixed to the work table of the CNC milling machine in which it is used. This uses up part of the table space that would otherwise be available when calibration operations are not being done. It also leaves the calibration device potentially "in harm's way", for example when work pieces are being installed or removed. There is a need for innovative technologies which make CNC calibration devices easy to quickly remove and install in a repeatable accurate way, and which make CNC calibration devices less subject to harm or misalignment from accidental impact.

The alignment mechanisms known in the art and provided by manufacturers of cutting-tool-contacting calibration devices can be and often are difficult to use. The difficulty arises in two ways. First, the alignment mechanisms provided by manufacturers of cutting-tool-contacting calibration devices typically require a substantial amount of labor time. Additionally, the alignment of cutting-tool-contacting calibration devices aligned using the manufacturer's alignment mechanism often rapidly go out of alignment from vibration or impact commonly incurred in the CNC work environment. There is a need for innovative mounting and alignment technologies for cutting-tool-contacting calibration devices, which facilitate rapid high-accuracy alignment of a calibration surface with a CNC work table surface. There is a further need for mounting and alignment technologies for cutting-tool-contacting calibration devices, which allow a calibration surface, once aligned, to be easily maintained in precise alignment, even through vibration and impact conditions.

SUMMARY OF THE INVENTION

It is an object of the present invention to provide innovative technologies that can reduce the labor costs of repeated calibration of CNC machines which are needed to eliminate errors that would otherwise result from cutting tool wear or changes in cutting length which may result from changing cutting tools. It is a further object of the present invention to provide innovative mounting and alignment technologies for cutting-tool-contacting calibration devices, to facilitate rapid high-accuracy alignment of a calibration surface with a CNC work table surface, and for square-probe cutting-tool-contacting calibration devices, to facilitate rapid, high-accuracy alignment a secondary calibration surface with a plane perpendicular to a Cartesian axis which is not perpendicular to the work surface.

It is a further object of the present invention to provide mounting and alignment technologies for cutting-tool-contacting calibration devices, which allow a calibration surface, once aligned, to be easily maintained in precise alignment, even through vibration and impact conditions. It is a further object of the present invention to provide innovative technologies which make CNC calibration devices easy to quickly remove and install in a repeatable accurate way, making more machine table space available when calibration is not being performed, and making CNC calibration devices less subject to harm or misalignment from accidental impact.

In a first aspect, the present invention provides a mounting mechanism to mount a cutting-tool-contacting calibration device to a CNC milling machine work table in such a way that the cutting-tool-contacting calibration device may be instantly removed from the work table and instantly replaced in a way that is self-positioning through gravity, to within 0.0001 inches of its pre-removal position. The mounting mechanism has two sides. The two sides mate and self align under the weight of the cutting-tool-contacting calibration device, or in some embodiments under force provided by magnetic or spring preload mechanisms. The first side of the mounting mechanism includes three precision-ground metal pieces, each of which mounts in one of the standard T-slots of the CNC work table, such that the three pieces are arranged in a triangle. Each of the three metal pieces includes a precision ground groove, and the three pieces are arranged such that none of the three grooves is parallel to any other of the three grooves. The three precision-ground grooves are arranged to mate with three semi-spherical protrusions from the second side of the mounting mechanism, which is affixed to the cutting-tool-contacting calibration device.

This mounting mechanism allows the cutting-tool-contacting calibration device to be lifted off the CNC work table and repositioned in seconds, with repeatable precision of less than 0.0001 inches. This aspect of the present invention also allows precise repositioning after impact, without need for adjustment or measurement of alignment.

In a second aspect, the present invention replaces the alignment mechanism of cutting-tool-contacting calibration devices such as the Renishaw OTS, with a leveling system more easily precisely adjustable, and more stable after adjustment, such that re-leveling is not required after typical vibration or impact. The leveling system of the present invention includes a clamping mechanism and a leveling mechanism. The leveling mechanism is functional when the clamping mechanism is released, and not functional when the clamping mechanism is engaged.

The alignment system includes three alignment adjustments. The first alignment adjustment uses a fine threaded screw mechanism to align the calibration surface of the cutting-tool-contacting calibration device with one Cartesian axis of the CNC work table surface. The second alignment adjustment uses a second fine threaded screw mechanism to align the calibration surface of the cutting-tool-contacting calibration device with the other Cartesian axis of the CNC work table surface. The third alignment adjustment uses a fine threaded screw mechanism to adjust rotation of the cutting-tool-contacting calibration device about the third Cartesian axis.

Once the calibration surface of the cutting-tool-contacting calibration device is aligned parallel to the surface of the CNC machine work table, the clamping mechanism of the present invention allows clamping the aligned parts to one another without exerting forces which would change the alignment. The clamping mechanism of the present invention includes, multiple non-parallel planar sections sheet metal which, in the clamped state, are each secured to the two parts of the present invention that are being clamped together, and which, in the un-clamped state, are each secured to only one of the two pieces to be clamped together.

DETAILED DESCRIPTIONS OF SOME PREFERRED EMBODIMENTS

Figure 1:
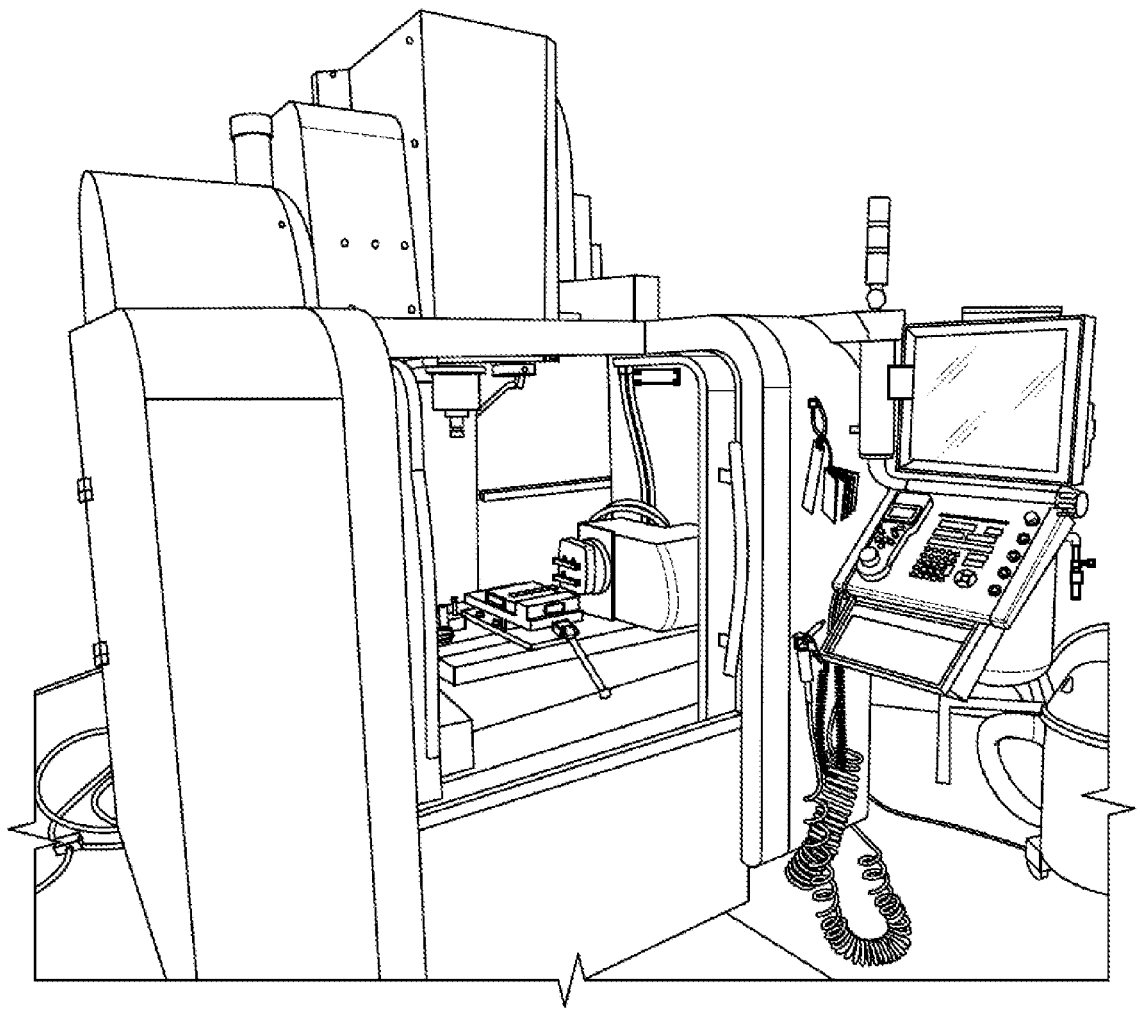
FIG. 1 depicts a CNC milling machine with a cutting-tool-contacting calibration device mounted to its work table according to aspects of the present invention.
Figure 2:
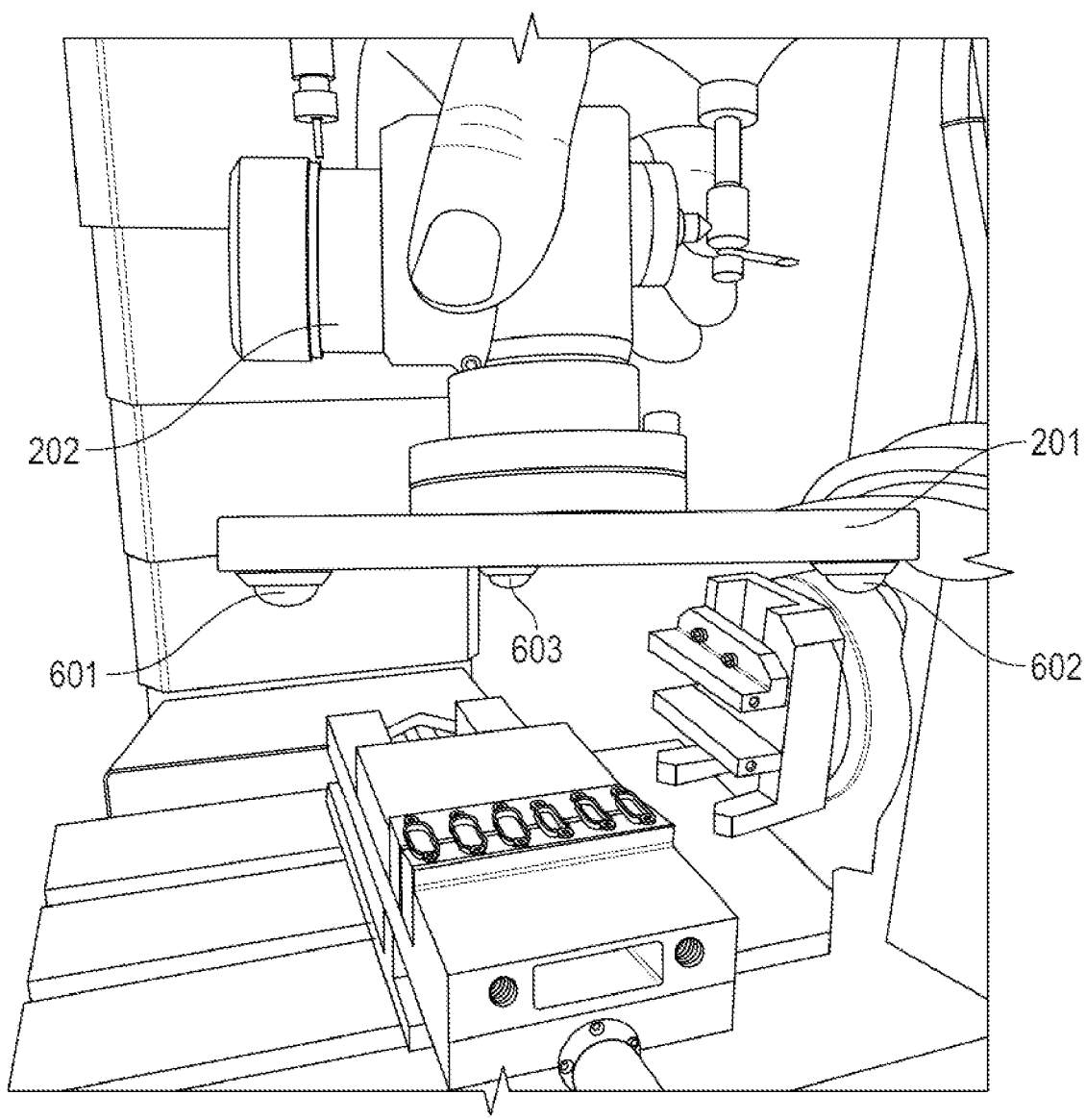
FIG. 2 is a photograph showing the upper half of an instantly removable alignment device according to the present invention.
Figure 3:
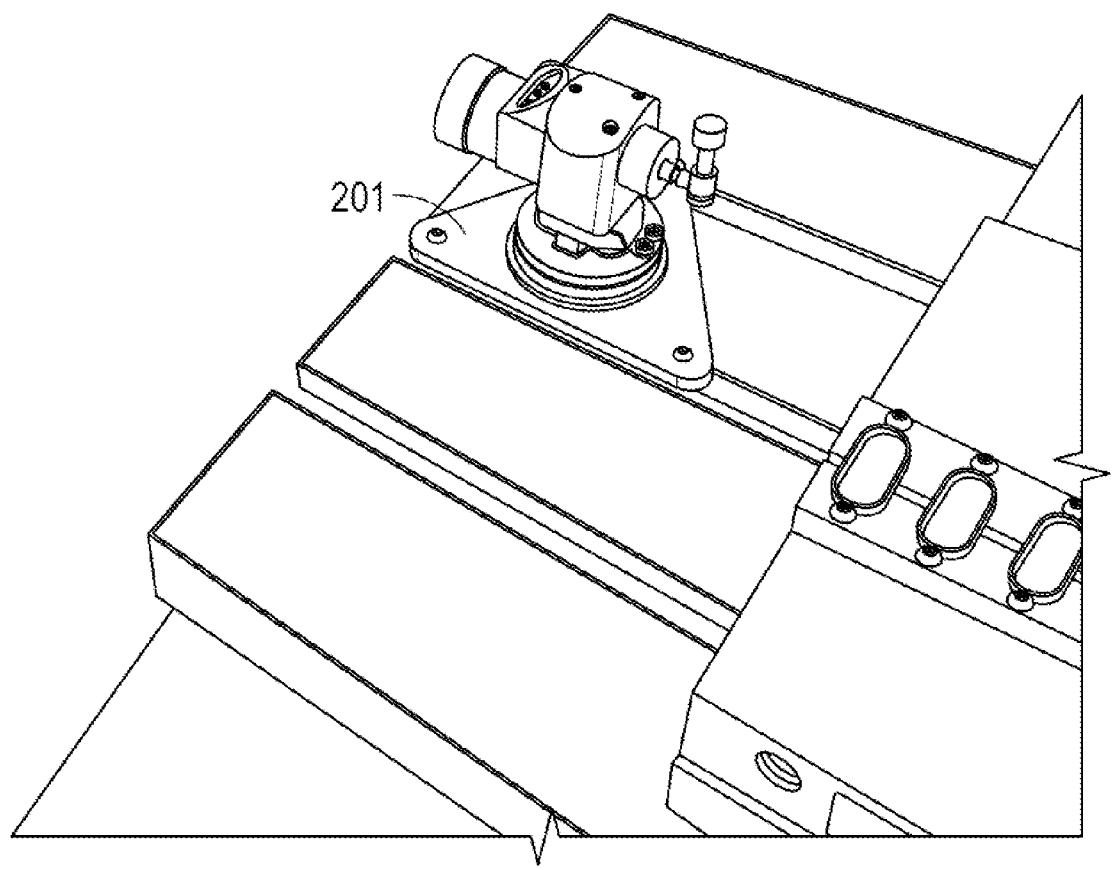
FIG. 3 is a photograph showing the work table of a CNC milling machine, with a cutting-tool-contacting calibration device mounted to the work table according to aspects of the present invention.
Figure 4:
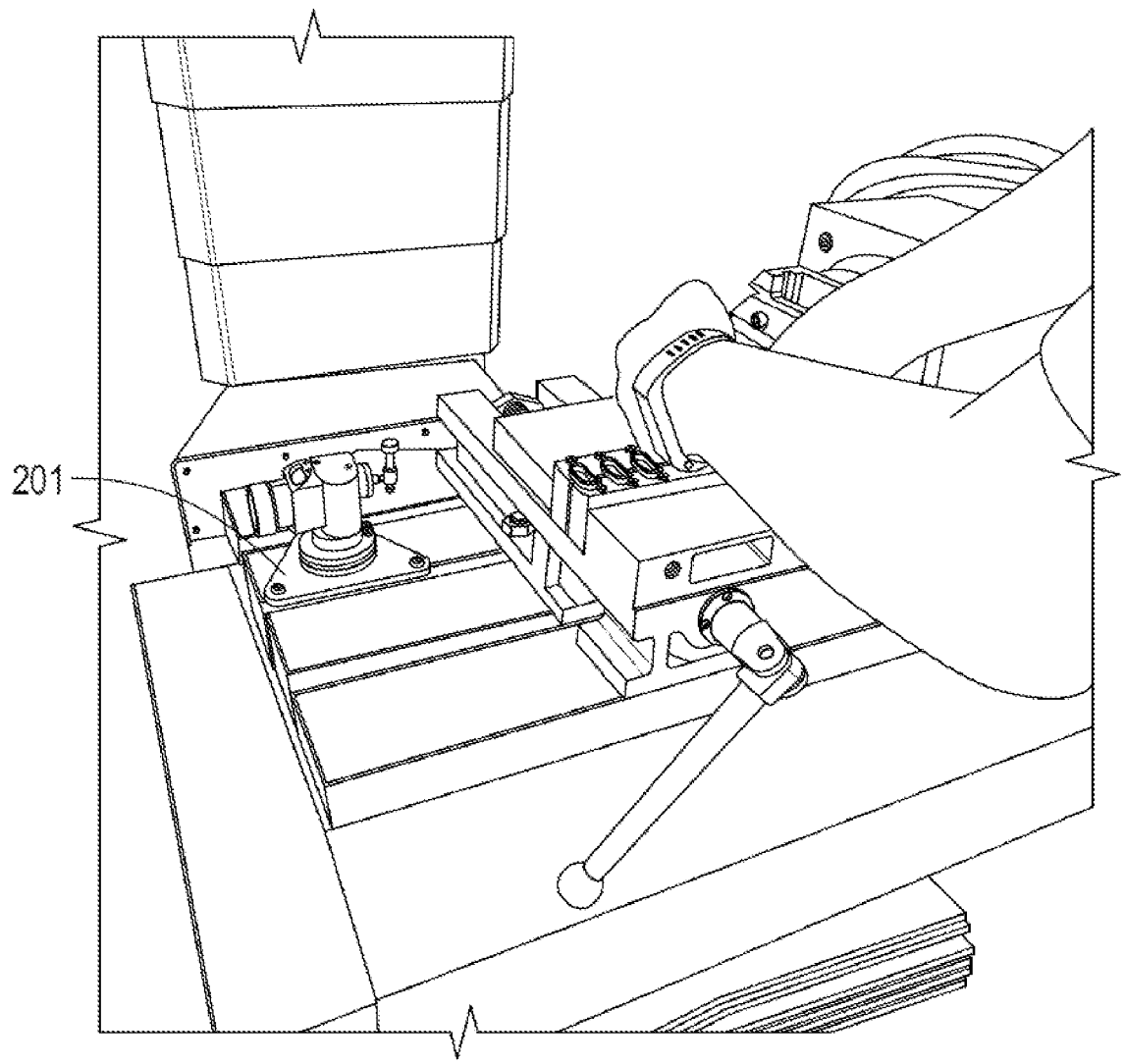
FIG. 4 is a photograph showing the work table of a CNC milling machine, with a cutting-tool-contacting calibration device mounted to the work table according to aspects of the present invention.
Figure 6:
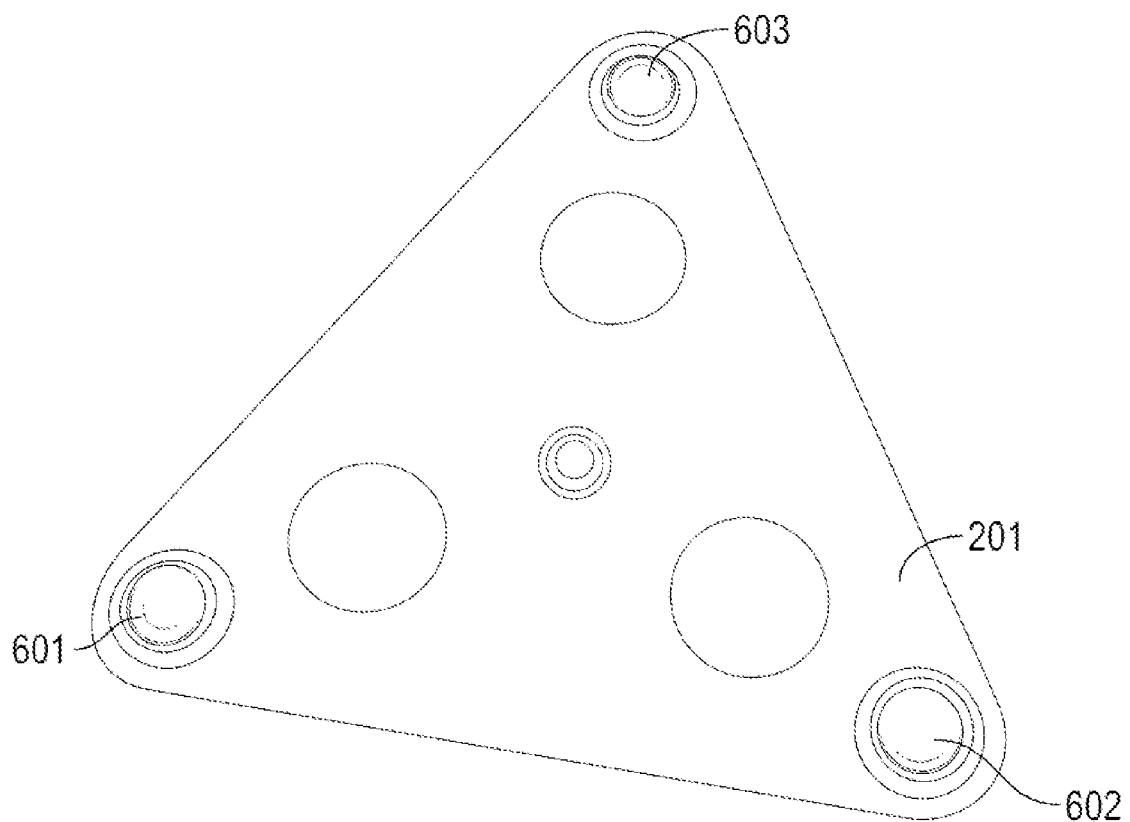
FIG. 6 is a photograph showing the bottom side of the upper half of an instantly removable alignment device according to the present invention, showing in triangular arrangement three spherical-section protrusions which self-align with and mate with three linear beveled grooved members mounted rigidly to a CNC milling machine work table.

In a first aspect, the present invention provides an instantly removable six-contact-point mounting system which mates a top component to a bottom component in an exact, self-aligning, repeatable way under the force of gravity, or a spring or magnetic force, or some combination thereof. The top component of the mounting system is composed of base plate 201 which is a rigid member with three identical protrusions protruding from one surface, where the surfaces of the protrusions are spherical sections (see FIGS. 2, 3, 4, and 6). In the embodiment shown, semi-spherical protrusions 601, 602, and 603, shown in bottom view in FIG. 6, and shown in side view in FIG. 2 are implemented by pressing like-diameter hardened steel balls into slightly undersized holes in base plate 201.

Figure 5:
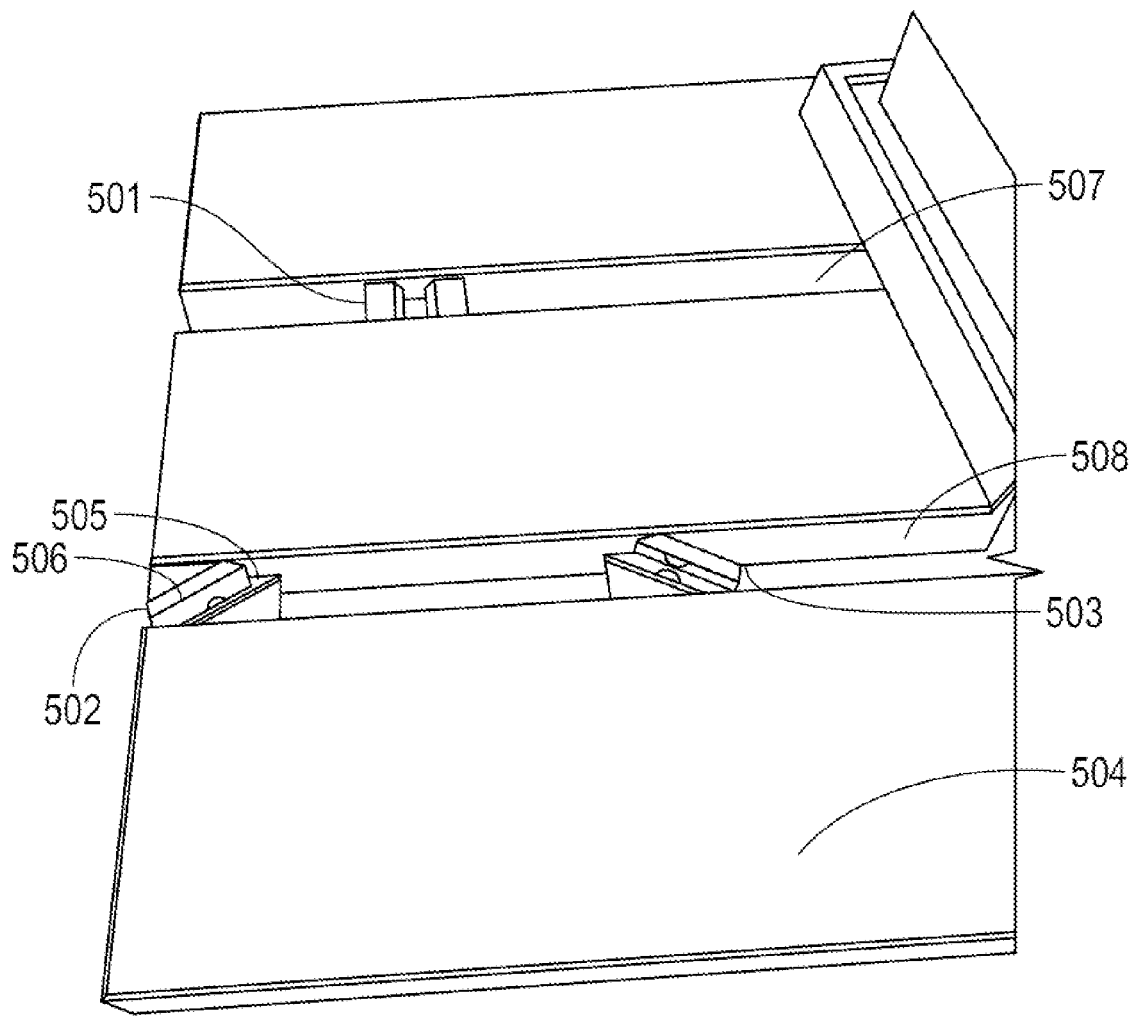
FIG. 5 is a photograph of three rigid linear-grooved members mounted with set screws within the T-slots of a CNC milling machine work table.

The bottom component of the instantly removable mounting system of the present invention consists of three linear-grooved-cut hardened metal members which are mounted within T-slots of CNC work table 504, as shown in FIG. 5. Each linear-grooved hardened metal member includes a linear, precision-ground hardened beveled linear groove cut into its surface, such that each beveled linear groove is positioned to receive one of semi-spherical members 601-603.

When spherical or semi-spherical member 601 is placed such that one point on its surface contacts beveled linear groove planar surface 505 of linear-grooved mounting member 505, and another point of its surface contacts beveled surface 506 of linear-grooved mounting member 505, the center of spherical or semi-spherical member 601 is constrained to move along a line parallel to the linear groove of mounting member 502. Likewise, when each of semi-spherical mounting member 602 is resting in the linear groove in mounting member 501, such that it has two points of contact with the beveled surfaces within linear-grooved mounting member 501, and when semi-spherical mounting member 603 is resting in the linear groove in mounting member 503, such that it has two points of contact with the beveled surfaces within linear-grooved mounting member 503, then the entire rigid structure on which semi-spherical mounting members 601-603 are mounted is exactly constrained to one unique position and orientation in 3-dimensional space.

When a user approximately mates spherical or semi-spherical members 601-603 with linear-grooved members 501-503, and lets go of the rigid structure to which semi-spherical members 601-603 are attached, the rigid structure to which spherical members 601-603 are attached will be pulled by gravity into the exact position and orientation that satisfies the conditions described above.

Although the three linear beveled grooves in rigid members 501-503 are shown as cut in separate rigid members which mount independently in milling machine work table T-slots, rigid members 502 and 503 could be manufactured as s single rigid member, with tow linear grooves placed the same distance apart as the non-parallel linear grooves of rigid members 502 and 503. Likewise, a single rigid member incorporating the linear grooves of rigid members 501-503 could be rigidly mounted to the surface of work table 504, giving similar functionality. The configuration shown in FIG. 5 is preferred in many situations, because it allows the entirety of rigid members 501-503, including the beveled linear groove surfaces, to be recessed below the work surface of CNC milling table 504. Thus any workpiece or vice that may be slid along the surface of work table 504 cannot impact rigid members 501-503, so their positions are easy to exactly maintain over time with respect to work table 504.

Figure 7:
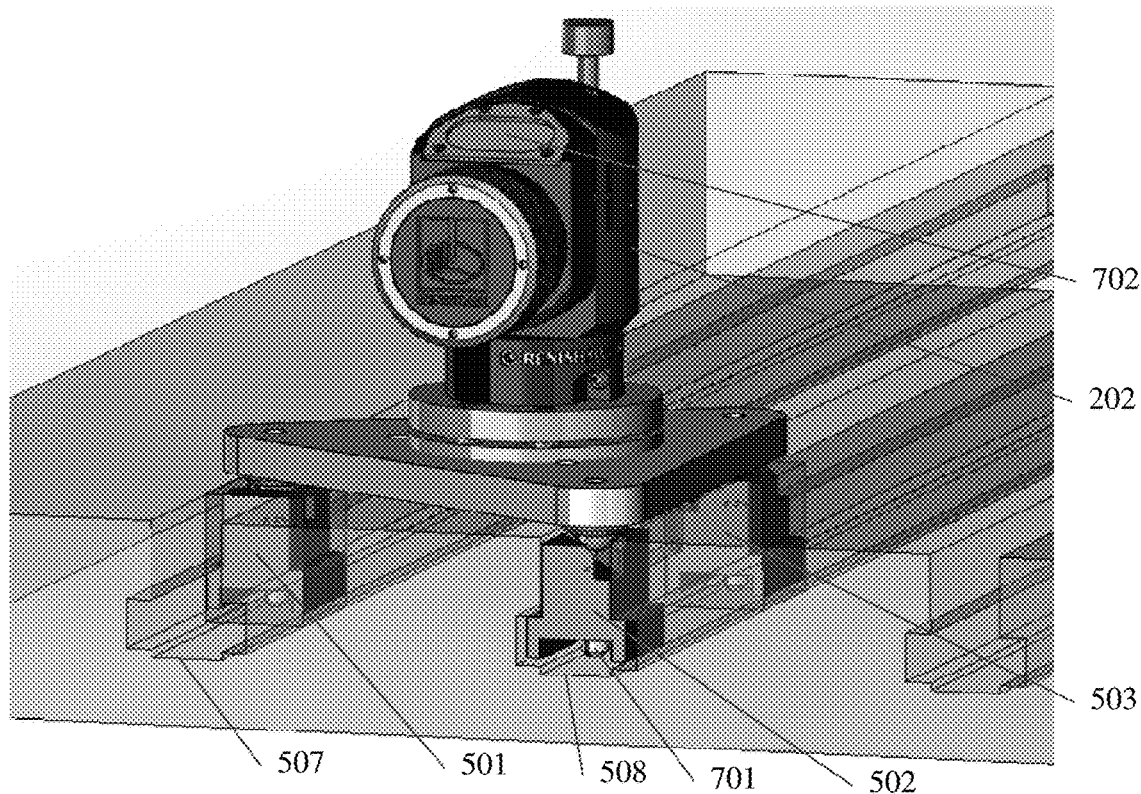
FIG. 7 is a transparent perspective view of a cutting-tool-contacting calibration device mounted to a CNC milling machine work table according to aspects of the present invention.

FIG. 7 is a transparent perspective view of a cutting-tool-contacting calibration device 202 mounted to a CNC milling machine work table according to aspects of the present invention. Linear-grooved-cut hardened metal members 501-503 are shown mounted in milling table T-slots 507 and 508, fixed in place by set screws such as set screw 701. Optical window 702 facilitates signal transmission in both directions between cutting-tool-contacting calibration device 202 and the control computer of the CNC milling machine in which cutting-tool-contacting calibration device 202 is being used.

Figure 8:
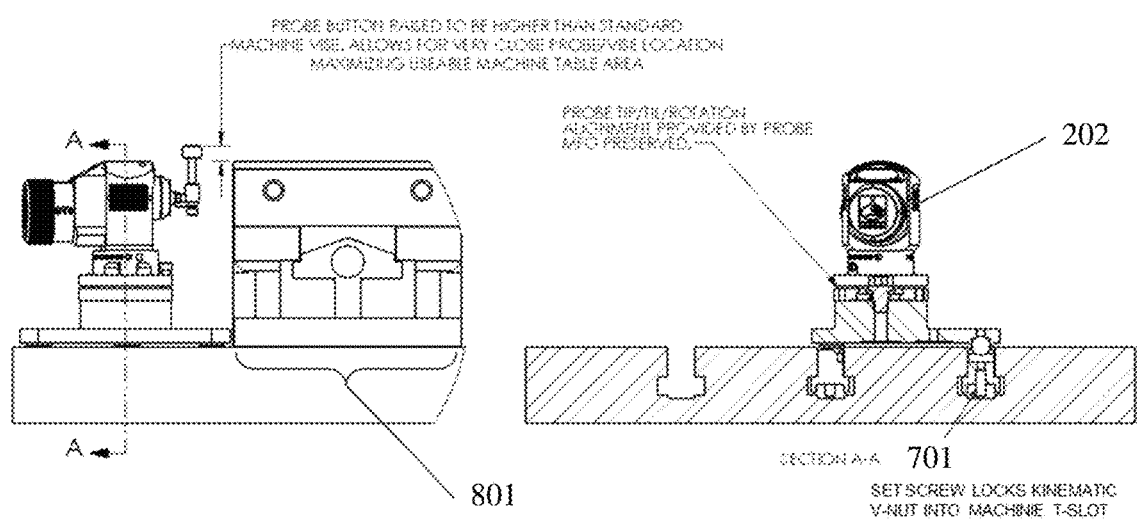
FIG. 8 depicts a side view and a sectional view of a cutting-tool-contacting calibration device mounted to a CNC milling machine work table according to aspects of the present invention.

FIG. 8 depicts a side view and a sectional view of a cutting-tool-contacting calibration device mounted to a CNC milling machine work table according to aspects of the present invention. In a preferred embodiment, the thickness of base plate 201 and associated hardware used to affix a cutting-tool-contacting calibration device 202 (such as the Renishaw OTS) to the base plate raises the calibration probe of the cutting-tool-contacting calibration device above the height of a standard machine vice 801, allowing for very close probe/vice location, thus maximizing useable machine table area.

Figure 9:
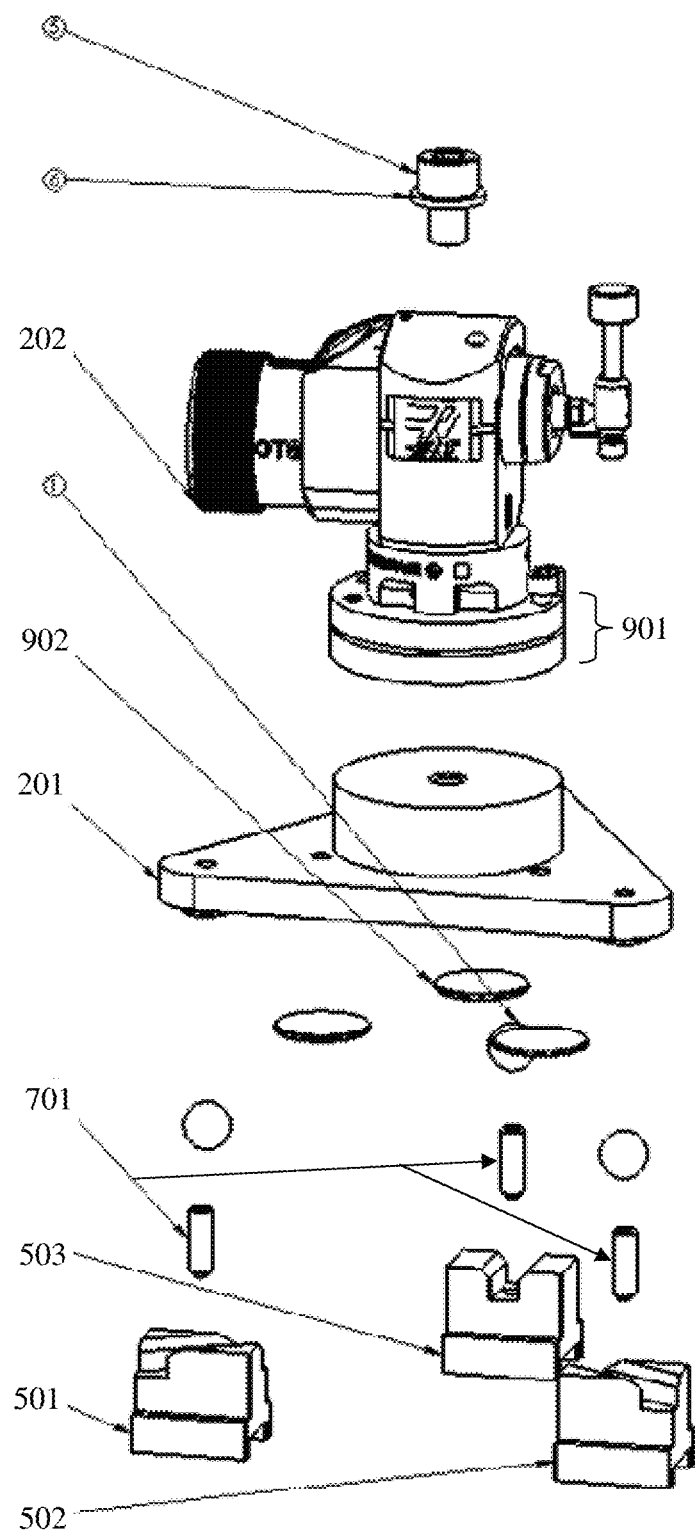
FIG. 9 is an exploded view of a preferred embodiment of the present invention for mounting a cutting-tool-contacting calibration device to a CNC milling machine work table, incorporating an OEM tip/tilt adjustment mechanism.

FIG. 9 is an exploded view of a preferred embodiment of the present invention for mounting a cutting-tool-contacting calibration device 202 (shown as the Renishaw OTS) to a CNC milling machine work table, incorporating an OEM tilt/rotation adjustment mechanism 901, and magnetic discs 902, which affix to the bottom of base plate 201, to provide a magnetic force to augment gravitational force in automatically precisely aligning the spherical section surfaces under base plate 201 with the hardened beveled surfaces of mating members 501-503.

In a second aspect, the present invention provides a tilt/rotation mechanism 1001 which allows easier, more precise two-dimensional tilt adjustment plus rotation adjustment, and improved stability compared with the OEM tilt/rotation adjustment for cutting-tool-contacting calibration devices such as the Renishaw OTS.

Figure 10:
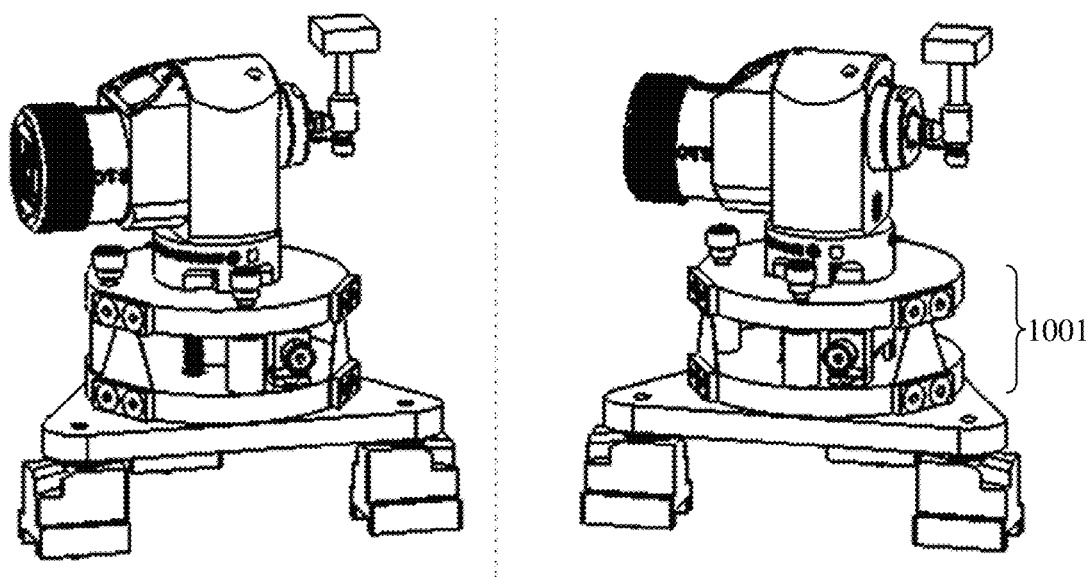
FIG. 10 is two perspective views of a preferred embodiment of the present invention for mounting a cutting-tool-contacting calibration device to a CNC milling machine work table, incorporating a to-dimensional tilt plus rotation adjustment mechanism according to aspects of the present invention.
Figure 11:
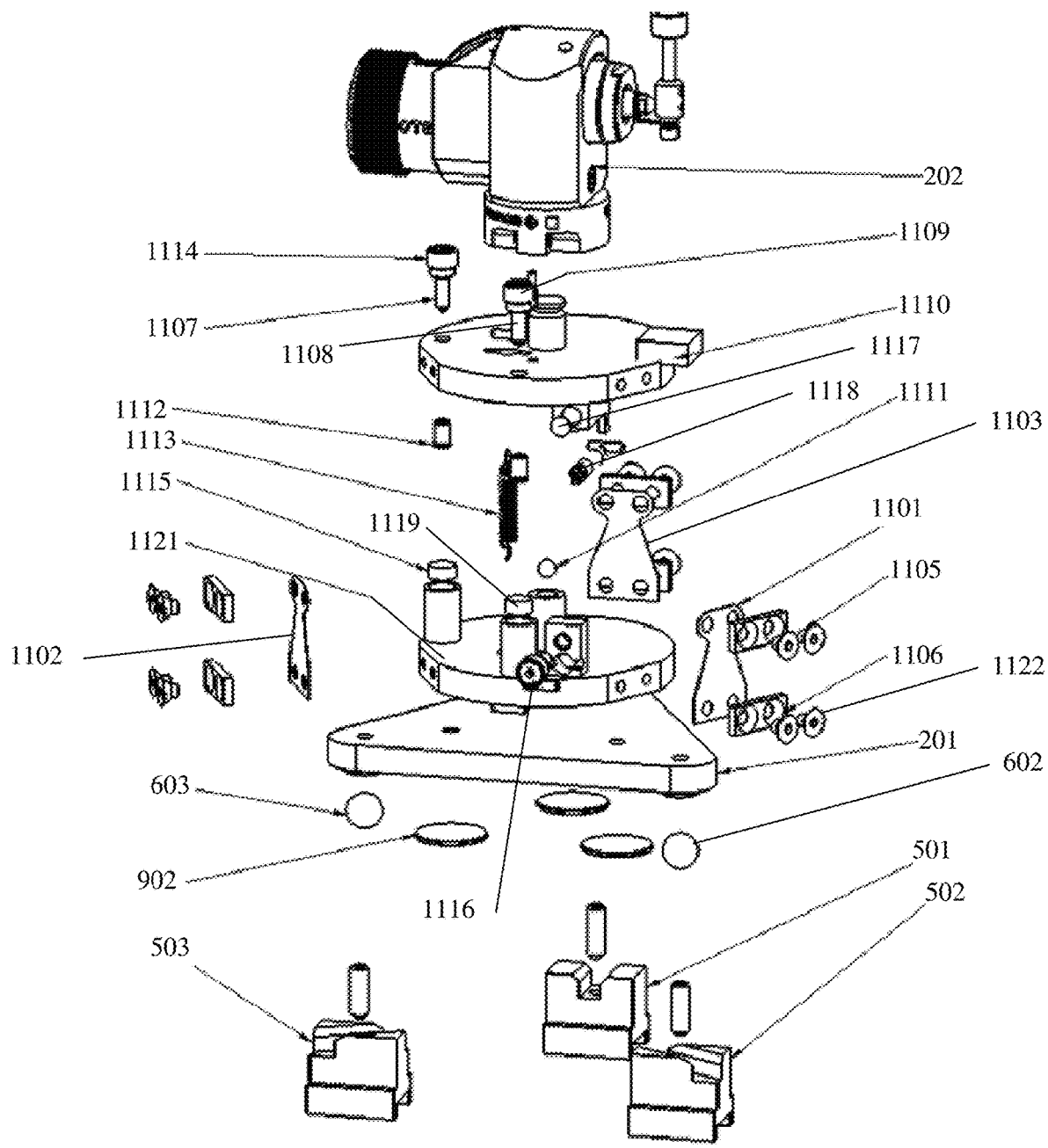
FIG. 11 is an exploded view of a preferred embodiment of the present invention, incorporating both an instantly removable mount for mounting a cutting-tool-contacting calibration device to a CNC milling machine work table, and an improved tip/tilt and rotation adjustment mechanism.

FIG. 11 is an exploded view of a preferred embodiment of the present invention, incorporating both an instantly removable mount for mounting a cutting-tool-contacting calibration device to a CNC milling machine work table, and the improved tilt and rotation adjustment mechanism shown assembled in FIG. 10.

Tilt adjustment knobs 1114 and 1109 may each be rotated to adjust tilt, in two orthogonal directions, respectively, provided that stay blades 1101-1103 are in an un-clamped state prior to turning knob 1114 and/or knob 1109. Blade stays 1101-1103 are each clampable by tightening a set of upper attachment screws (such as screws 1105) and a set of lower attachment screws (such as screws 1122). In a preferred embodiment, the clearance holes through each blade stay for such lower attachment screws are tight-tolerance, and the clearance holes through each blade stay for such upper attachment screws are larger, giving "wiggle room" for the tilt adjustment process.

In a preferred embodiment, just prior to adjusting tilt, one loosens all six upper blade-stay clamping screws such as screw pair 1105, and then turns adjustment knob 1114 to adjust tilt of one Cartesian axis of tilt upper tilt plate 1110 with respect to lower tilt plate 1121, and then turns adjustment knob 1109 to adjust tilt of a second Cartesian coordinate of upper tilt plate 1110 with respect to lower tilt plate 1121. During the tilt adjustment process, upper tilt plate 1110 is supported on three points: one bearing point on the surface of ball bearing 1111, one bearing point at the tip of ball-tipped adjustment screw 1107, and one point at the tip of ball-tipped adjustment screw 1108.

Tension spring 1113 provides the force needed to keep all three bearing points in contact during the adjustment. Male threads of tilt adjustment screws 1107 and 1108 mate with female threads of threaded bushings such as bushing 1112, which are press-fit into holes in upper tilt plate 1110. In a preferred embodiment, the ball tips of tilt adjustment screws 1107 and 1108 rest against planer surfaces of hardened planar bearings 1115 and 1119, which may be composed of sapphire.

In a similar manner of action to adjustment knobs 1114 and 1109 (which adjust tilt along first and second Cartesian axes), adjustment knob 1116 may be turned by hand to adjust rotation about the third Cartesian axis. This rotation adjustment is needed for alignment of square-probe cutting-tool-contacting calibration devices. Adjustment knob 1116 couples to a threaded ball-tipped member, the ball tip of which provides a force against planar bearing 1117, equal to and opposite to a force provided by rotational restoring spring 1118.

After the tilt adjustment is completed using adjustment knobs 1114 and 1109, upper tilt plate 1110 and lower tilt plate 1121 are fixed in position relative to each other by tightening the upper pair of blade stay clamping screws on each blade stay. In a preferred embodiment, a two-hole washer such as washer 1106 sits between the heads of each clamping screw pair (such as clamping screw pair 1105. Because the dual-hole washers cannot rotate as clamping screws such as clamping screw pair 1105 are tightened, minimal torque is applied to tilt plate 1110 during the clamping process, so tilt adjustment remains highly accurate during clamping.

Figure 12:
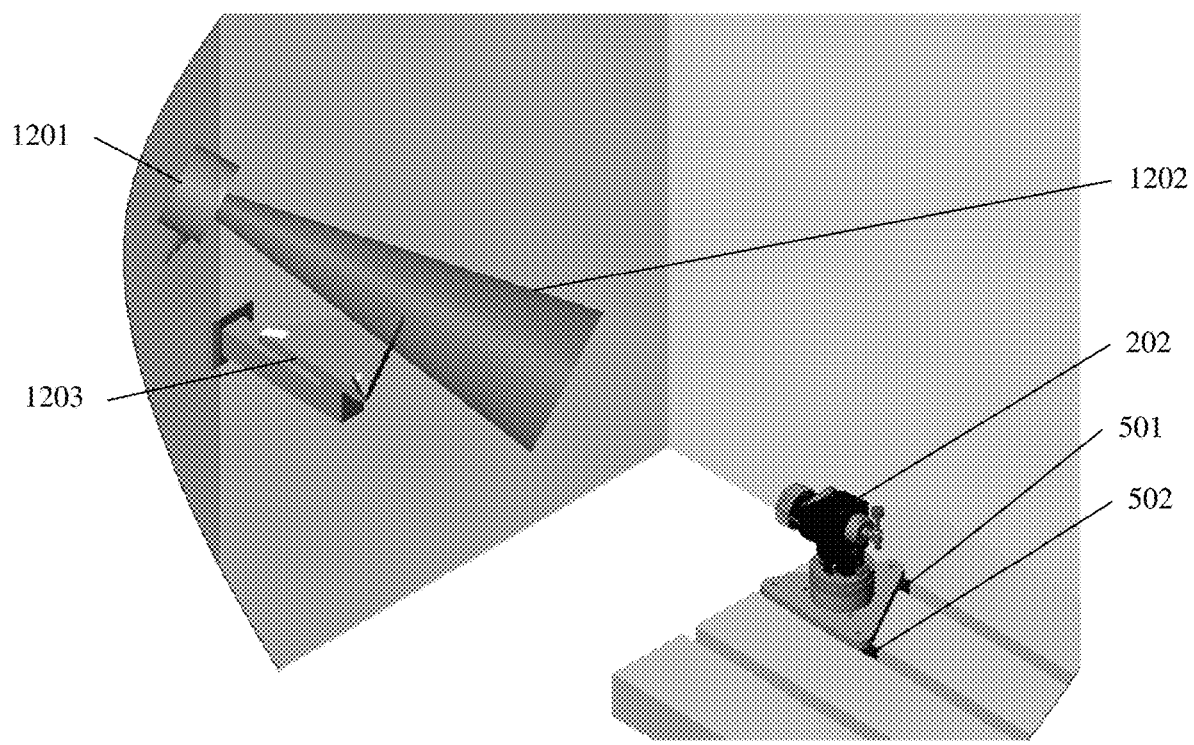
FIG. 12 is view of part of the inside of a CNC milling machine enclosure, including a cutting-tool-contacting calibration device mounted to the CNC work table according to aspects of the present invention, and showing the remotenest aspect of the present invention.
Figure 13:
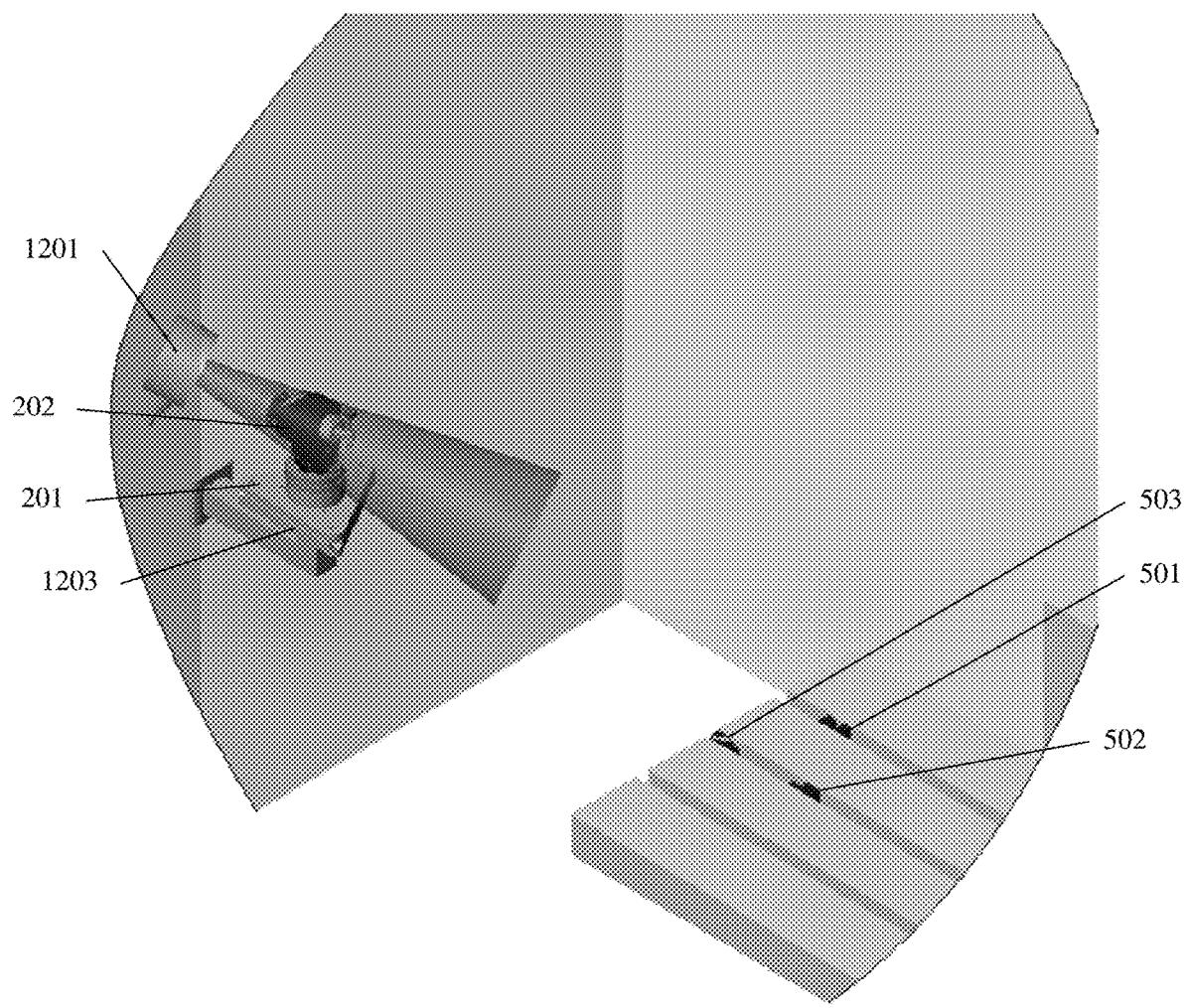
FIG. 13 is view of part of the inside of a CNC milling machine enclosure, including part of the CNC work table, and a cutting-tool-contacting calibration device resting in a remote nest according to aspects of the present invention.

In a third aspect, the present invention provides a remote nest 1203 (see FIG. 12) for mounting inside the machining enclosure of a CNC milling machine, to which cutting-tool-contacting calibration device 202, attached to base 201, may rapidly be put when it is desirable to remove cutting-tool-contacting calibration device 202 from the milling machine work table. In a preferred embodiment, remote nest 1203 is positioned such that the optical field of view (which includes conical section 1202) of optical communications link 1201 (which communicates with cutting-tool-contacting calibration device 202 through optical window 702) includes optical window 702 both when cutting-tool-contacting calibration device 202 is removably mounted to the milling machine work table, and when cutting-tool-contacting calibration device 202 is removably mounted to remote nest 1203.

In a preferred embodiment, remote nest 1203 includes six planar-section surfaces which each mate in a self-aligning way with unique contact points on spherical sections 601-603, automatically positioning cutting-tool-contacting calibration device 202 in remote nest 1203 in a stable, easily repeatable way with minimal effort.

Figure 14:
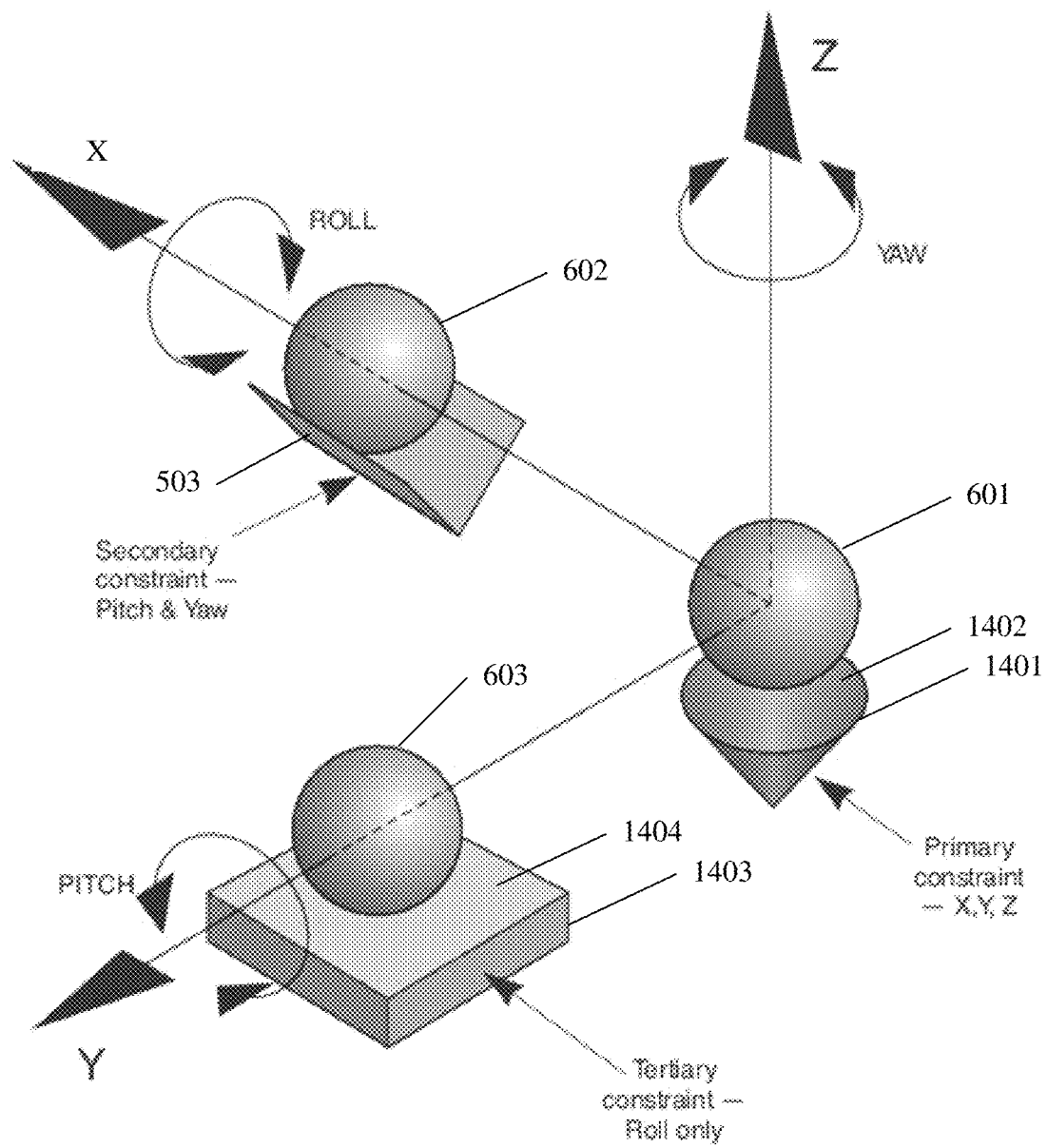
FIG. 14 depicts the automatic alignment principles of an alternate embodiment of the present invention to that depicted in figures in FIGS. 5, 9, and 11.
Figure 15:
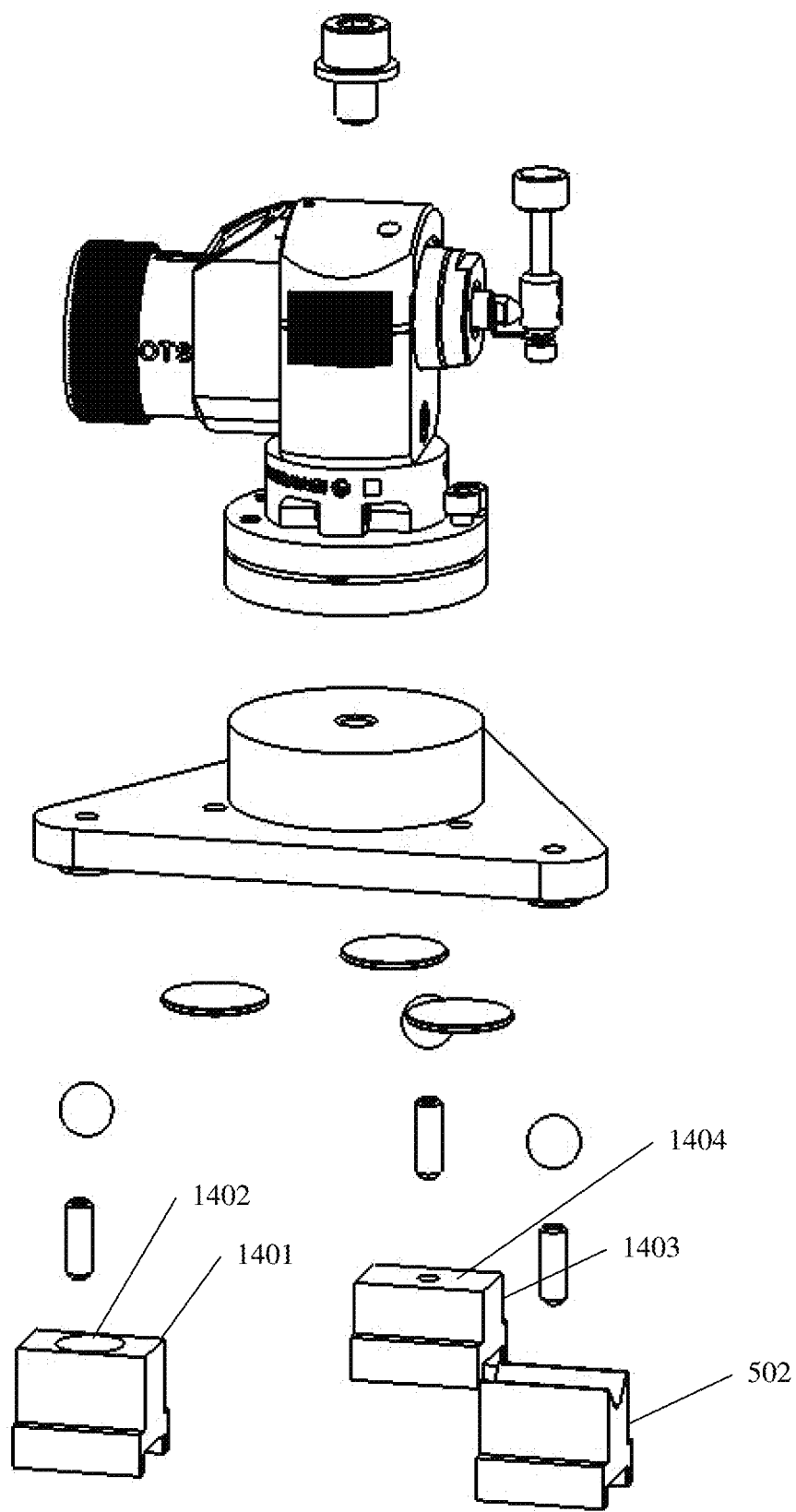
FIG. 15 depicts an embodiment of the present invention utilizing alternate self-aligning members to those shown in FIGS. 5, 9, and 11, for mating with the spherical-section protrusions of the present invention.
Figure 16:
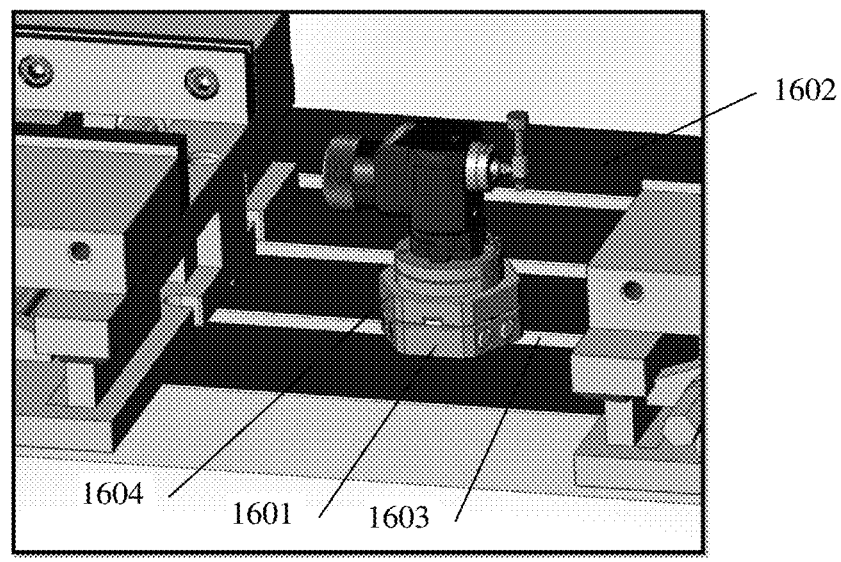
FIG. 16 depicts the work table of a CNC milling machine, with a cutting-tool-contacting calibration device mounted to the work table according to an alternate embodiment of the present invention.
Figure 17:
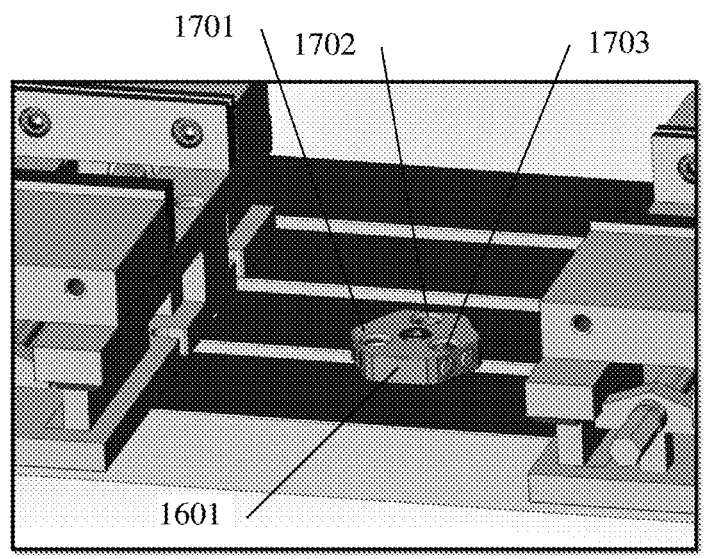
FIG. 17 depicts the bottom half of an instantly removable mount system of the present invention shown in FIG. 16, where the bottom half of the mount system is secured in place as shown in FIGS. 18, 19, and 20.
Figure 18:
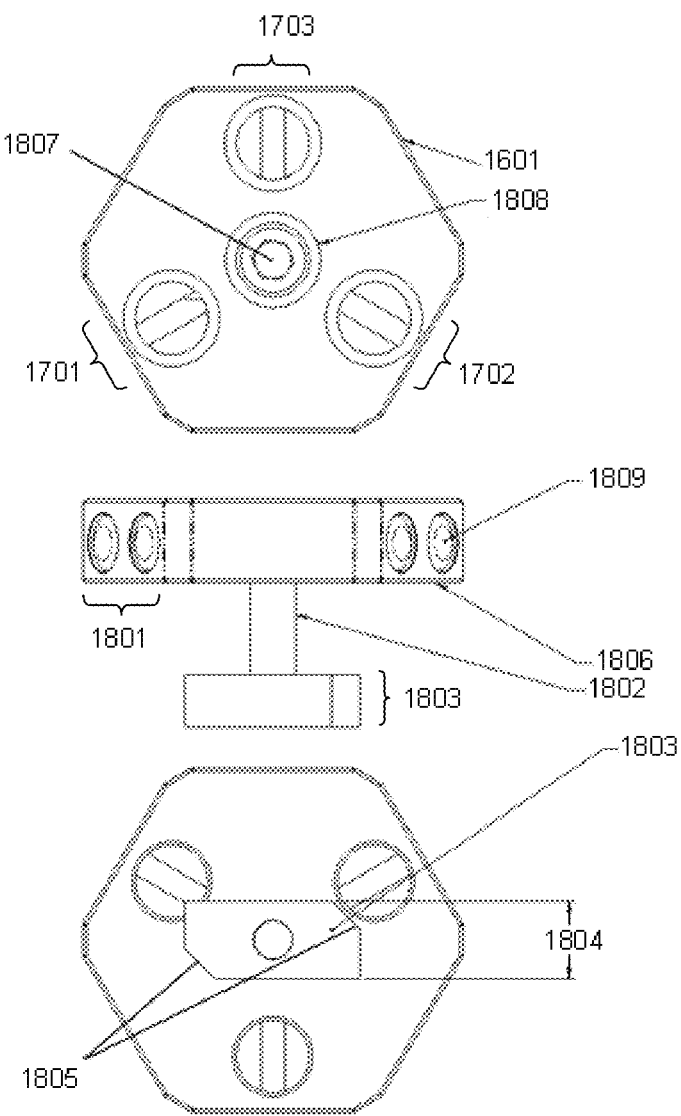
FIG. 18 depicts the bottom half of the embodiment of the instantly removable mount system shown in FIGS. 16 and 17, showing details of the "drop in and twist" fastening system which allows T-slot engagement without sliding in form the end of a T slot.

In an alternate instantly removable mount embodiment to that depicted in FIGS. 5, 9, and 11, the members that mate with spherical-section-protrusions 601-603 is depicted in FIGS. 14 and 15, where spherical-section-protrusion 602 mates with v-grooved member 502, spherical-section-protrusion 601 mates with a conical indentation 1402 in rigid member 1401, and spherical-section-protrusion 603 mates with planar surface 1404 of rigid member 1403. In this embodiment, rigid member 1401 constrains the center of sphere 601 in all three Cartesian coordinates constrains yaw around the z axis and pitch around the y axis, and planar surface 1404 constrains roll around the x axis.

An alternate instantly removable mount embodiment is depicted in FIGS. 16-20. In this alternate embodiment, linear-grooved mating surfaces 1701, 1702, and 1703 (analogous to linear-grooved members 501, 502, and 503 in embodiments disclosed above) are each formed by pressing in place into rigid member 1601 two hardened dowel pins, through pairs of holes such as holes 1801. Rigid member 1601 is clamped to work table surface 1602 by threaded member 1802, which engages table-clamping nut 1803, which has minor dimension 1804, which allows special nut 1803 to be dropped into T-slot 1901 in a direction perpendicular to work table surface 1602.

Figure 19:
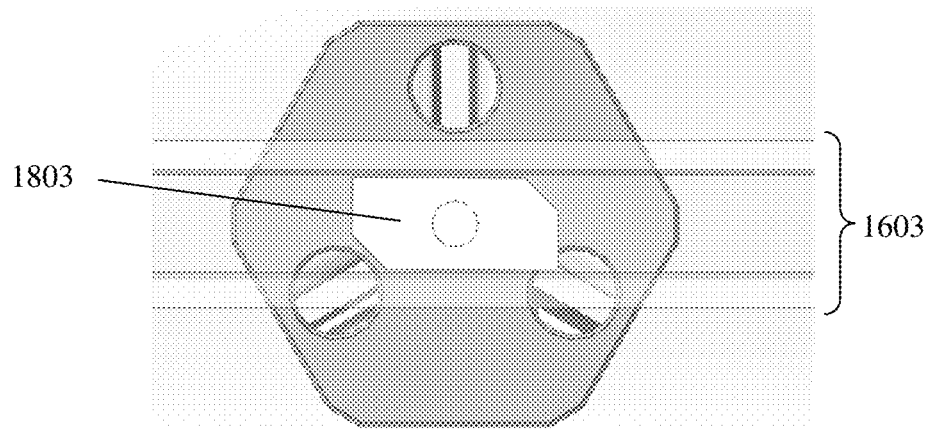
FIG. 19 is a "see-through" view of the embodiment of the present invention shown in solid view in FIGS. 16 & 17, and in three line drawing views in FIG. 18, with twistable engagement member dropped into a T slot of a milling machine work table, but not engaged.
Figure 20:
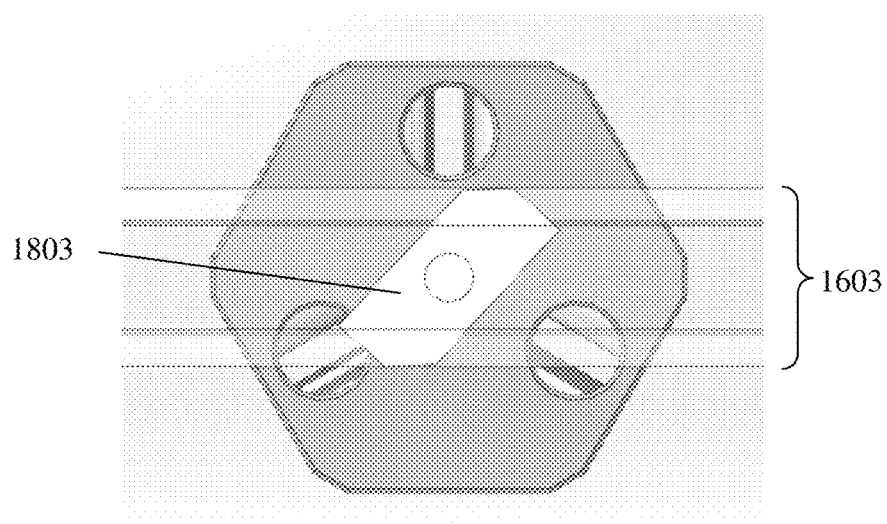
FIG. 20 is a "see-through" view of the embodiment of the present invention shown in solid view in FIGS. 16 & 17, and in three line drawing views in FIG. 18, with twistable engagement member dropped engaged in a T slot of a milling machine work table.

Once table-clamping nut 1803 is dropped into T-slot 1603 in the orientation shown in FIG. 19, such that surface 1806 mates with work table surface 1602, threaded member 1802 is turned in the "clamping" direction via hex socket 1807 within counter bore 1808 in rigid member 1601, such that table-clamping nut 1803 rotates to the orientation shown in FIG. 20. Once table-clamping nut 1803 is in the orientation shown in FIG. 20, further rotation of threaded member 1802 in the "clamping" direction serves to clamp surface 1806 against work table surface 1602.

Figure 21:
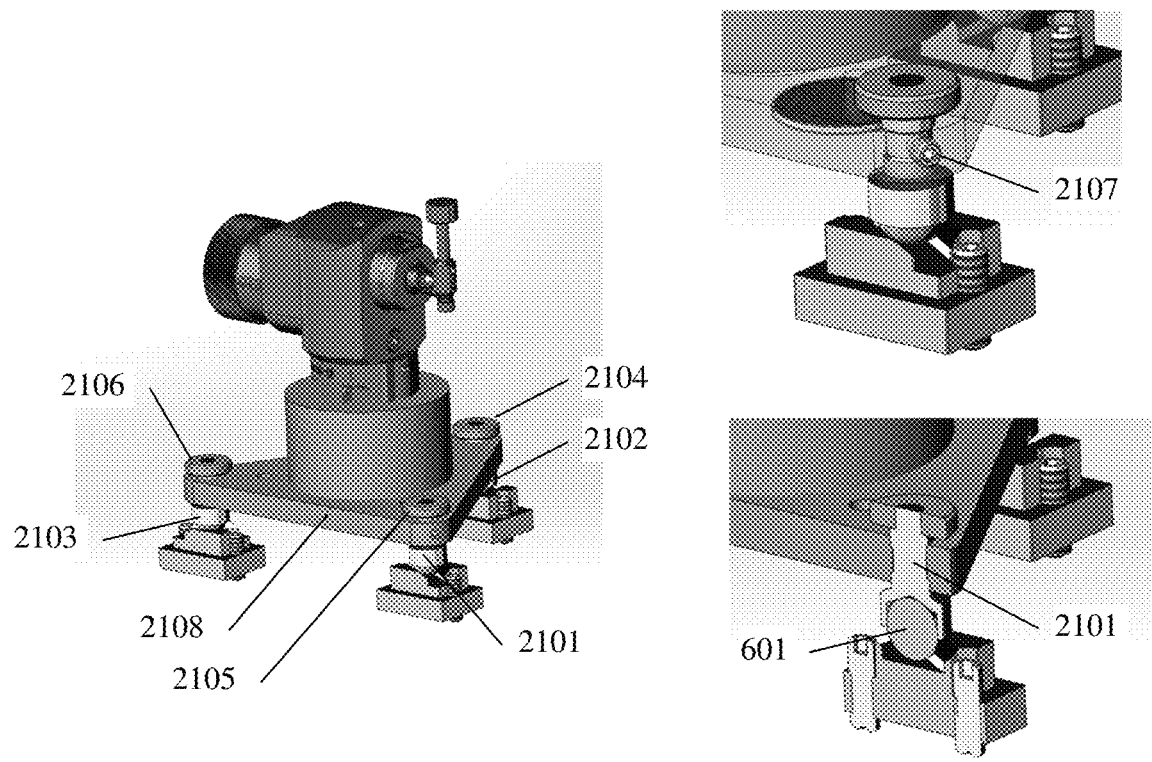
FIG. 21 depicts an embodiment of an instantly-removable mount according to the present invention, incorporating a three-screw leveling system.

An alternate leveling mechanism to that shown in FIGS. 10 and 11 is depicted in FIG. 21. In this embodiment, instead of being press-fit into base 201, hardened balls 601, 602, and 603 are press-fit into fine-threaded members 2101, 2102, and 2103, which are threaded through base 2101 (analogous to base 201). Adjustment knobs 2104, 2105, and 2106 may be turned to turn threaded members 2101, 2102, and 2103 to level base 2101 as desired, and then set screws such as set screw 2107 may be tightened to prevent further rotation of fine-threaded members 2101, 2102, and 2103 after leveling is complete.

Figure 22:
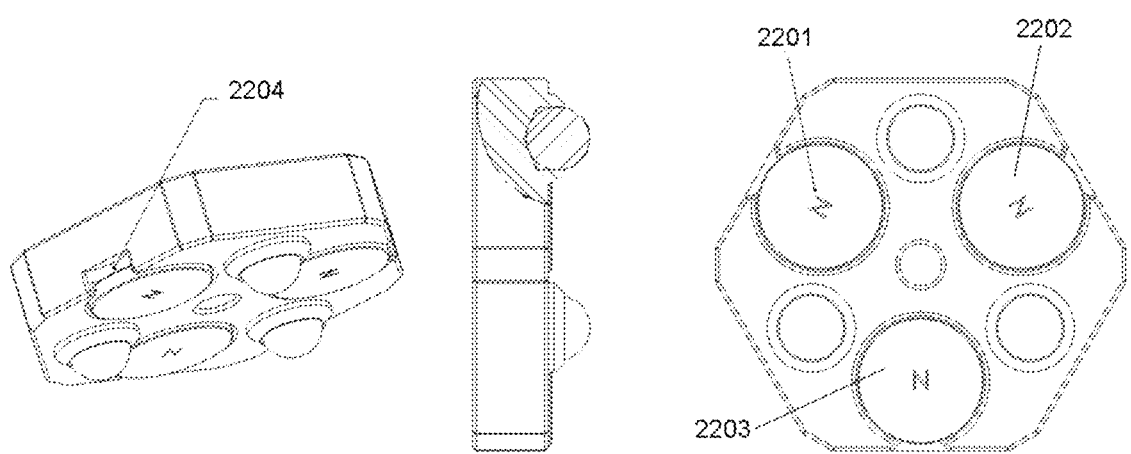
FIG. 22 depicts the top half of an instantly removable mount according to the present invention, with removable clamping magnets.

FIG. 22 depicts the top half of an exemplary embodiment of an instantly removable mount according to the present invention, with removable clamping magnets 2201, 2202, and 2203 installed in counter bores with like magnetic polarity, and held in place by their own magnetic force. Magnet removal slots such as magnet removal slot 2204 facilitate the use of a prying tool to remove magnets 2201, 2202, and 2203, for instance for cleaning.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

What is claimed is:

1. A tilt adjustment mechanism for a cutting-tool-contacting calibration device, comprising:
    a first tilt plate, configured to attach to a cutting-tool-contacting calibration device;
    a second tilt plate, configured to attach to a milling machine work table;
    three blade stays, each configured to attach at a first end to said first tilt plate, and to attach at a second end to said second tilt plate;
    two threaded adjustment screws, the tips of which are configured to apply pressure to one of said first or second tilt plates.

2. The tilt adjustment mechanism of claim 1, further comprising a third adjustment screw, the tip of which is configured to apply rotational torque of said first tilt plate relative to said second tilt plate about an axis perpendicular to one of said tilt plates.

* * * * *